(12) United States Patent
Baba et al.

(10) Patent No.: US 10,569,627 B2
(45) Date of Patent: Feb. 25, 2020

(54) DOOR SEAL FOR A VEHICLE DOOR

(71) Applicant: NABTESCO CORPORATION, Tokyo (JP)

(72) Inventors: Yasushige Baba, Hyogo (JP); Hitoshi Akiyama, Hyogo (JP); Atsuhito Yamaguchi, Hyogo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 14/898,360

(22) PCT Filed: Jun. 24, 2014

(86) PCT No.: PCT/JP2014/066613
§ 371 (c)(1),
(2) Date: Dec. 14, 2015

(87) PCT Pub. No.: WO2014/208516
PCT Pub. Date: Dec. 31, 2014

(65) Prior Publication Data
US 2016/0137043 A1    May 19, 2016

(30) Foreign Application Priority Data
Jun. 28, 2013  (JP) .................................. 2013-136337

(51) Int. Cl.
*B60J 10/40*  (2016.01)
*B60J 10/80*  (2016.01)
*B60J 10/277*  (2016.01)

(52) U.S. Cl.
CPC ............. *B60J 10/40* (2016.02); *B60J 10/277* (2016.02); *B60J 10/80* (2016.02)

(58) Field of Classification Search
CPC ........... B60J 10/27; B60J 10/277; B60J 10/40
(Continued)

(56) References Cited

U.S. PATENT DOCUMENTS

| 3,461,611 A | * | 8/1969 | Axe ....................... E06B 7/2312 |
| | | | 49/483.1 |
| 4,288,135 A | * | 9/1981 | Buchser ................ F25D 23/028 |
| | | | 312/296 |

(Continued)

FOREIGN PATENT DOCUMENTS

| CN | 202117528 U | 1/2012 |
| DE | 911376 C3 | 5/1954 |

(Continued)

OTHER PUBLICATIONS

International Search Report as issued in International Patent Application No. PCT/JP2014/066613, dated Sep. 16, 2014.

(Continued)

*Primary Examiner* — Gregory J Strimbu
(74) *Attorney, Agent, or Firm* — Pillsbury Winthrop Shaw Pittman, LLP

(57) ABSTRACT

A door seal includes: a first seal mechanism including a first seal portion provided at an end of a door and a second seal portion configured to contact the first seal portion when the door is closed; and a second seal mechanism including a third seal portion provided at the end of the door and a fourth seal portion configured to contact the third seal portion when the door is closed. The third seal portion and the first seal portion are arranged at different locations along a thickness direction of the door.

10 Claims, 8 Drawing Sheets

(58) Field of Classification Search
USPC .................. 49/483.1, 484.1, 498.1
See application file for complete search history.

(56) References Cited

U.S. PATENT DOCUMENTS

| | | | |
|---|---|---|---|
| 5,280,754 A | 1/1994 | Flanagan et al. | |
| 5,433,031 A | 7/1995 | Dailey | |
| 6,125,591 A | 10/2000 | Schmidhuber et al. | |
| 7,603,813 B2* | 10/2009 | Hackl | E05F 15/42 49/120 |
| 8,061,084 B2* | 11/2011 | Katzensteiner | B60J 10/0091 49/27 |
| 2011/0011004 A1* | 1/2011 | Courrian | B61D 19/026 49/483.1 |
| 2015/0082705 A1* | 3/2015 | Kaczmarczyk | E06B 7/2309 49/368 |

FOREIGN PATENT DOCUMENTS

| | | |
|---|---|---|
| DE | 94 18 117 U1 | 2/1995 |
| EP | 0 900 708 A1 | 3/1999 |
| EP | 2 243 678 A1 | 10/2010 |
| GB | 1 470 056 A | 4/1977 |
| GB | 2 202 891 A | 10/1988 |
| JP | 11-139309 A | 5/1999 |
| JP | 2008-001303 A | 1/2008 |
| JP | 2011-126368 A | 6/2011 |

OTHER PUBLICATIONS

International Preliminary Report on Patentability and the Written Opinion of the International Searching Authority as issued in International Patent Application No. PCT/JP2014/066613, dated Jan. 7, 2016.
Notification of Reason for Rejection as issued in Taiwanese Patent Application No. 103122147, dated Nov. 13, 2015.
Notification of Reason for Rejection as issued in Japanese Patent Application No. 2015-524047, dated Jul. 1, 2016.
First Notification of Reason for Rejection as issued in Chinese Patent Application No. 201480037218.2, dated Nov. 9, 2016.
Decision of Rejection as issued in Japanese Patent Application No. 2015-524047, dated Nov. 4, 2016.
Extended European Search Report as issued in European Patent Application No. 14817041.8, dated Jan. 25, 2017.

* cited by examiner

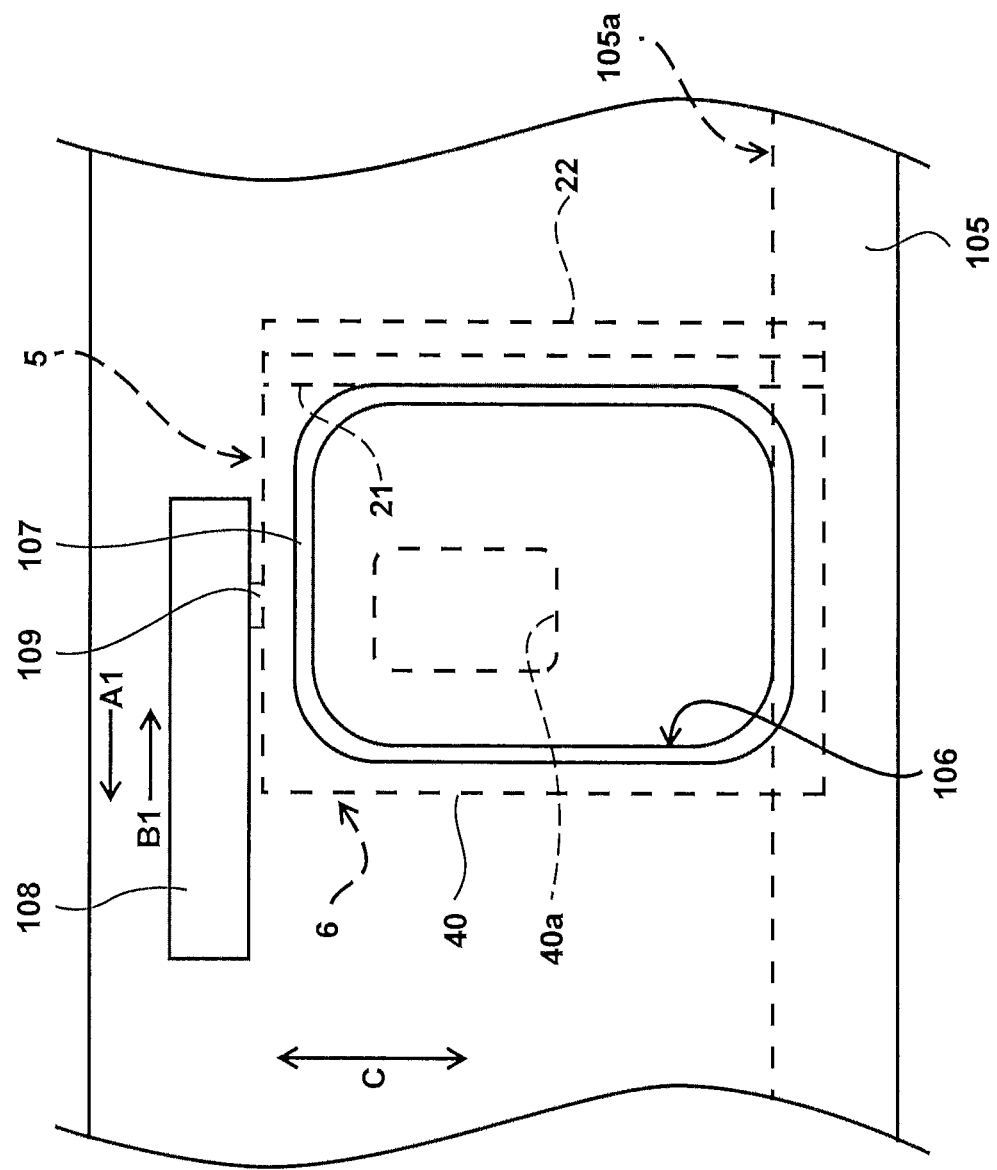

DOOR SEAL FOR A VEHICLE DOOR

CROSS-REFERENCE TO RELATED APPLICATIONS

This application is the U.S. National Stage of PCT/JP2014/066613, filed Jun. 24, 2014, which in turn claims priority to Japanese Patent Application No. JP 2013-136337, filed Jun. 28, 2013. The contents of these applications are incorporated herein by reference in their entireties.

TECHNICAL FIELD

The present invention relates to a door seal including a seal mechanism having a first seal portion provided on a door end of a door and a second seal portion contacting the first seal portion when the door is closed, and a vehicle door including the door seal.

BACKGROUND

There has been known a door seal in which a first seal portion provided on a door end of a door contacts a second seal portion so as to seal the door when the door is closed. For example, Japanese Patent Application Publication No. 2008-1303 ("the JP '303 Publication") discloses a vehicle door seal for sealing between ends of a pair of door leaves when a doorway of a vehicle such as a railway vehicle is closed. The vehicle door seal disclosed in the JP '303 Publication includes a pair of door end rubber strips. One of the door end rubber strips is installed on one of the door leaves at the door end thereof serving as the closing end. The other of the door end rubber strips is installed on the other of the door leaves at the door end thereof serving as the closing end.

Both door end rubber strips are provided with a projecting part extending vertically. When the doorway of the vehicle is closed, the projecting part of the one door end rubber strip and the projecting part of the other door end rubber strip contact each other to create a seal between them.

SUMMARY

As described above, in the vehicle door seal disclosed in the JP '303 Publication, the projecting part of the one door end rubber strip and the projecting part of the other door end rubber strip contact each other to create a seal between them. In such a structure, there is no sudden increase or decrease of atmospheric pressure in the vehicle if the atmospheric pressure difference between outside and inside of the vehicle is small enough.

However, there may be a circumstance where the atmospheric pressure difference between outside and inside of the vehicle is suddenly increased. Such a circumstance may occur in the cases where, for example, the vehicle enters a tunnel at a high speed, the vehicle goes out of a tunnel at a high speed, or two vehicles pass each other at high speeds.

When the atmospheric pressure difference between outside and inside of a vehicle is suddenly increased as described above, the vehicle door seal disclosed in the JP '303 Publication may allow the air to pass between the projecting portions of the one and the other door end rubber strips from the higher pressure side to the lower pressure side. Therefore, the vehicle door seal disclosed in the JP '303 Publication suffers from a problem of sudden increases and decreases of the atmospheric pressure in the vehicle. The sudden increases and decreases of the atmospheric pressure in the vehicle may produce an unpleasant sensation to ears of people in the vehicle.

To overcome the above problems, one object of the present invention is to provide a door seal that suppresses sudden increases and decreases of the atmospheric pressure inside the door even when the pressure difference between outside and inside of the door is suddenly increased, and a vehicle door including the door seal.

(1) To achieve the above object, a door seal according to an aspect of the present invention comprises: a first seal mechanism including a first seal portion provided at a door end of a door and a second seal portion configured to contact with the first seal portion when the door is closed; and a second seal mechanism including a third seal portion provided at the door end of the door and positioned differently in the thickness direction of the door from the first seal portion and a fourth seal portion configured to contact with the third seal portion when the door is closed, wherein when the door is closed, a first contact surface formed by the first seal portion and the second seal portion extends in a different direction than a second contact surface formed by the third seal portion and the fourth seal portion.

According to this arrangement, the two seal mechanisms are positioned separately in the widthwise direction of the door, and thus each of the seal mechanisms may be deformed with no impact on the deformation of the other. Therefore, the tightness of the door can be increased.

Further, according to this arrangement, the first contact surface between the first seal portion and the second seal portion of the first seal mechanism may extend in a different direction than the second contact surface between the third seal portion and the fourth seal portion of the second seal mechanism. Thus, for example, even if it is difficult to maintain the tightness of one of the contact surfaces in connection with the atmospheric pressures inside and outside the door, the other of the contact surfaces can retain the tightness.

Accordingly, this arrangement provides a door seal that suppresses sudden increases and decreases of the atmospheric pressure inside the door even when the atmospheric pressure difference between outside and inside of the door is suddenly increased.

The directions of the contact surfaces (the first contact surface and the second contact surface) are perpendicular to the directions in which the contact surfaces spread.

(2) More preferably, one of the first contact surface and the second contact surface extends in a direction along a direction in which the door moves, and the other of the first contact surface and the second contact surface extends in a direction intersecting the direction in which the door moves.

According to this arrangement, the direction of one contact surface may be along the moving direction of the door, whereas the direction of the other contact surface may intersect the moving direction of the door. Therefore, a certain degree of tightness can be ensured at the one contact surface with the force to close the door; and even if the tightness cannot be maintained at the one contact surface due to presence of a foreign matter such as dust, the tightness can be ensured at the other contact surface.

(3) More preferably, the first seal mechanism or the second seal mechanism includes a projection as one of the seal portions thereof and a recess shaped such that when the door is closed, the projection is fitted in the recess with a side surface thereof contacting with a side surface of the recess.

According to this arrangement, the outside air tends to flow along the gap formed between the projection and the recess; therefore, the flow path of the air can be elongated without thickening the door, thereby to increase the "conduit resistance." Thus, the tightness of the door can be increased without changing the thickness of the door.

(4) More preferably, when the door is closed, a gap is formed between the side surface of the projection and the side surface of the recess, and the seal mechanism including the projection and the recess is deformed by an external force imparted thereon, such that the side surface of the projection and the side surface of the recess contact with each other.

According to this arrangement, when an external force (e.g., the atmospheric pressure difference between the outside air and the inside air) imparted on the seal mechanism is increased and the seal mechanism is deformed, the side surfaces of the projection and the side surfaces of the recess may contact each other. Thus, in closing and opening the door, the side surfaces of the projection and the side surfaces of the recess in the seal mechanism may not contact each other, which increases the durability of the seal mechanism.

(5) More preferably, the first or second seal mechanism including the projection and the recess is provided on an inner side of the other seal mechanism in a thickness direction of the door.

According to this arrangement, when the door is closed, the seal mechanism in which the direction of the contact surface is along the moving direction of the door is positioned on the outer side of the other seal mechanism in the thickness direction of the door. Thus, it can be ensured that foreign matters are prevented from entering the recess from outside the door.

(6) To achieve the above object, a vehicle door according to an aspect of the present invention comprises: any one of the above-described door seals; and a vehicle door installed on a vehicle, wherein the first seal portion and the third seal portion of the door seal are provided at the door end of the vehicle door, and the second seal portion and the fourth seal portion of the door seal are provided at an opposite surface facing the door end of the vehicle door.

This arrangement produces the same effect as the door seal according to an aspect of the present invention. That is, this arrangement provides a vehicle door that suppresses sudden increases and decreases of the atmospheric pressure inside the vehicle even when the atmospheric pressure difference between outside and inside of the vehicle is suddenly increased.

The present invention provides a door seal and a vehicle door that suppress sudden increases and decreases of the atmospheric pressure inside the door even when the atmospheric pressure difference between outside and inside of the door is suddenly increased.

BRIEF DESCRIPTION OF THE DRAWINGS

FIG. 8 is a schematic view showing a vehicle door seal and a vehicle door according to a third embodiment of the present invention, along with a part of a vehicle.

DESCRIPTION OF EXAMPLE EMBODIMENTS

The embodiments of the present invention will now be described with reference to the drawings. The embodiments described below are exemplarily in the form of a vehicle door seal for sealing between ends of a pair of door leaves or between an end of a door leaf and a vehicle body when the doorway of the vehicle is closed, and a vehicle door including the vehicle door seal; however, the present invention is not limited thereto but can be applied to other types of doors.

First Embodiment (Vehicle Door)

Figure 1:
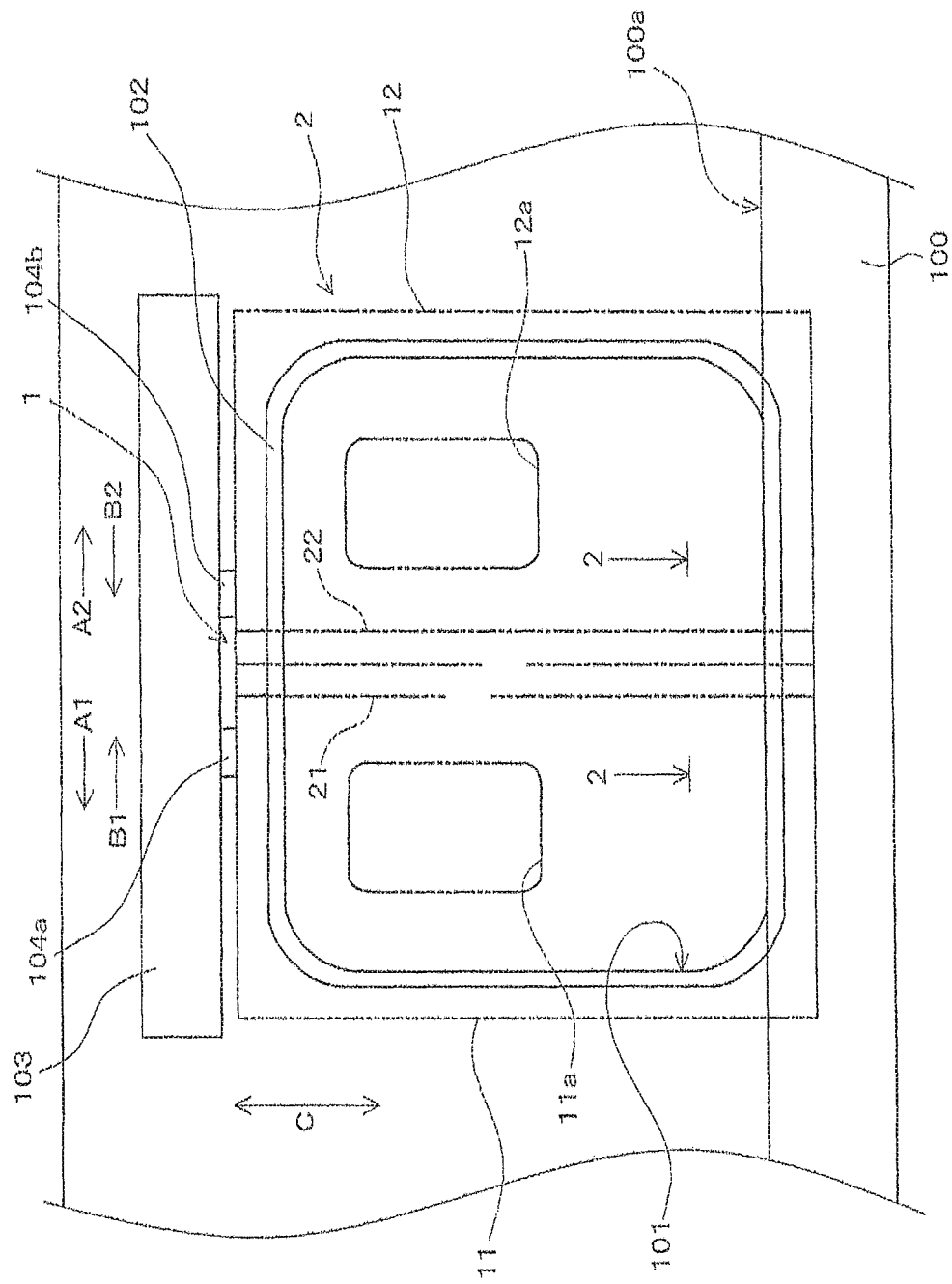
FIG. 1 is a schematic view showing a vehicle door seal and a vehicle door according to a first embodiment of the present invention, along with a part of a vehicle.

FIG. 1 is a schematic view showing a vehicle door seal 1 and a vehicle door 2 according to a first embodiment of the present invention, along with a part of a vehicle 100. The vehicle door 2 may be installed on the vehicle 100 such as a railway vehicle and may constitute a double-leaf biparting door structure including a pair of door leaves 11, 12.

FIG. 1 is a schematic view as viewed from inside of the vehicle 100. In FIG. 1, the vehicle door 2 is represented with a two-dot chain line, and the level of the floor 100a of the vehicle 100 is represented with a broken line. The arrows A1 and A2 in FIG. 1 represent the directions in which the pair of door leaves 11, 12 move to open. The arrows B1 and B2 in FIG. 1 represent the directions in which the pair of door leaves 11, 12 move to close. The arrow C in FIG. 1 represents the vertical direction. The directions in which the pair of door leaves 11, 12 open and close are parallel to the front-rear direction of the vehicle 100. The front-rear direction of the vehicle 100 is parallel to the direction in which the vehicle 100 travels.

The vehicle door 2 shown in FIG. 1 may include a pair of door leaves 11, 12 and a vehicle door seal 1. The pair of door leaves 11, 12 may be installed on the doorway 101 of the vehicle 100. The pair of door leaves 11, 12 may constitute a double-leaf biparting door structure for opening and closing the doorway 101. In this embodiment, the pair of door leaves 11, 12 may be positioned on the inner side of the doorway 101 in the widthwise direction of the vehicle 100. The door leaf 11 is provided with a window 11a having a glass plate, etc. attached thereto. The door leaf 12 is provided with a window 12a having a glass plate, etc. attached thereto.

(Door Driving Device and Door Hanger)

The pair of door leaves 11, 12 may be opened and closed by a door driving device 103. The door driving device 103 may include, for example, an electric motor, a driving pulley, a driven pulley, and a driving belt (all not shown).

The electric motor may drive the driving pulley. The driving pulley may be connected to, e.g., the output shaft of the electric motor and may rotate along with the output shaft of the electric motor. The driving force of the driving pulley may be transmitted to the driven pulley via the driving belt, and the driven pulley may rotate in accordance with the rotation of the driving pulley. The driving belt may be a circular round belt and may be stretched around the driving pulley and the driven pulley. The driving belt stretched around the driving pulley and the driven pulley is arranged so as to extend substantially in parallel with the front-rear direction of the vehicle between the driving pulley and the driven pulley.

The pair of door leaves 11, 12 may be connected to the door driving device 103 via a pair of door hangers (104a, 104b). The door hanger 104a may hang and support the door leaf 11. The door hanger 104a may be provided to connect the door driving device 103 and the door leaf 11. The door hanger 104b may hang and support the door leaf 12. The door hanger 104b may be provided to connect the door driving device 103 and the door leaf 12.

One end of the door hanger 104a may be connected to the driving belt of the door driving device 103 and the other end thereof may be connected to the door leaf 11. The door hanger 104a may be fixed on the driving belt at one of a pair of zone portions thereof extending in parallel between the driving pulley and the driven pulley.

One end of the door hanger 104b may be connected to the driving belt of the door driving device 103 and the other end thereof may be connected to the door leaf 12. The door hanger 104b may be fixed on the driving belt at the other of the pair of zone portions thereof extending in parallel between the driving pulley and the driven pulley.

With the above arrangement, the door driving device 103 can drive the door leaves 11, 12 so as to open and close the doorway. That is, in operation of the door driving device 103, the electric motor may actuate to rotate the driving pulley, and the driving belt stretched around the driving pulley and the driven pulley may be turned. Accordingly, the pair of door hangers 104a, 104b connected to the driving belt may be moved in opposite directions along the front-rear direction of the vehicle. Additionally, the pair of door leaves 11, 12 may be moved along with the pair of door hangers 104a, 104b. Thus, the door leaves 11, 12 may be opened and closed.

In opening the doorway 101, the pair of door leaves 11, 12 may be driven by the door driving device 103 in the directions of moving away from each other. That is, in opening the doorway 101, the door leaf 11 may be driven in the direction of the arrow A1, and the door leaf 12 may be driven in the direction of the arrow A2. In closing the doorway 101, the pair of door leaves 11, 12 may be driven by the door driving device 103 in the directions of approaching each other. That is, in closing the doorway 101, the door leaf 11 may be driven in the direction of the arrow B1, and the door leaf 12 may be driven in the direction of the arrow B2.

The door driving device 103 may also include, for example, a pair of guide rails (not shown). Each of the door hangers 104a, 104b or each of the door leaves 11, 12 may be provided with rollers for rolling along the guide rail.

The guide rails may be provided as rail members for guiding the movement of the door hangers 104a, 104b. One of the pair of guide rails may be arranged so as to correspond to the door hanger 104a and the door leaf 11. The other of the pair of guide rails may be arranged so as to correspond to the door hanger 104b and the door leaf 12.

Each of the guide rails may be provided with a straight rail portion extending straight along the front-rear direction of the vehicle and a curved rail portion curving with respect to the straight rail portion. The curved rail portions may be continuous to the straight rail portions and may be curved in the widthwise direction of the vehicle 100 with respect to the straight rail portion. The curved rail portions of the guide rails may be positioned closer to the center of the doorway 101 in the front-rear direction of the vehicle 100. The curved rail portions of the guide rails may be curved toward the outside in the widthwise direction of the vehicle 100 with respect to the straight rail portions.

The rollers provided on the door hangers 104a, 104b or the door leaves 11, 12 may be installed so as to roll along the straight rail portions and the curved rail portions of the guide rails. When the door leaves 11, 12 are driven by the door driving device 103 to open and close the doorway, the rollers may roll and move along the straight rail portions and the curved rail portions. Thus, the door leaves 11, 12 may be guided toward predetermined directions and may move along the straight rail portions and the curved rail portions.

In closing the doorway 101, the ends of the pair of door leaves 11, 12 may be urged against each other such that these ends are tightly contacting via the vehicle door seal 1 (described later). Furthermore, in closing the doorway 101, the rollers may move along the curved rail portions of the guide rails, such that the door leaves 11, 12 may be moved outward from inside the vehicle along the widthwise direction of the vehicle 100 and urged against the vehicle 100. That is, in closing the doorway 101, the door leaves 11, 12 may be urged against the vehicle 100 at the edges of the doorway 101.

The vehicle 100 may be provided with a doorway seal 102 at the edges of the doorway 101. The doorway seal 102 may be a seal member made of rubber or a resin. The doorway seal 102 may be a seal member extending circularly along the edges of the doorway 101 arranged in a substantial rectangle. The doorway seal 102 may be attached inside the vehicle 100. The doorway seal 102 may have a flat end surface on the widthwise inner side of the vehicle 100. In closing the doorway 101, the door leaves 11, 12 and the vehicle door seal 1 (described later) may be urged against the flat end surface of the doorway seal 102 on the widthwise inner side of the vehicle 100.

(Vehicle Door Seal)

Next, a vehicle door seal 1 according to the first embodiment of the present invention will now be described. The vehicle door seal 1 shown in FIG. 1 may seal between the ends of the pair of door leaves 11, 12 when the doorway 101 of a vehicle is closed. The vehicle door seal 1 may be installed on the ends of the pair of door leaves 11, 12. The vehicle door seal 1 may include a first seal member 21 and a second seal member 22.

Figure 2:
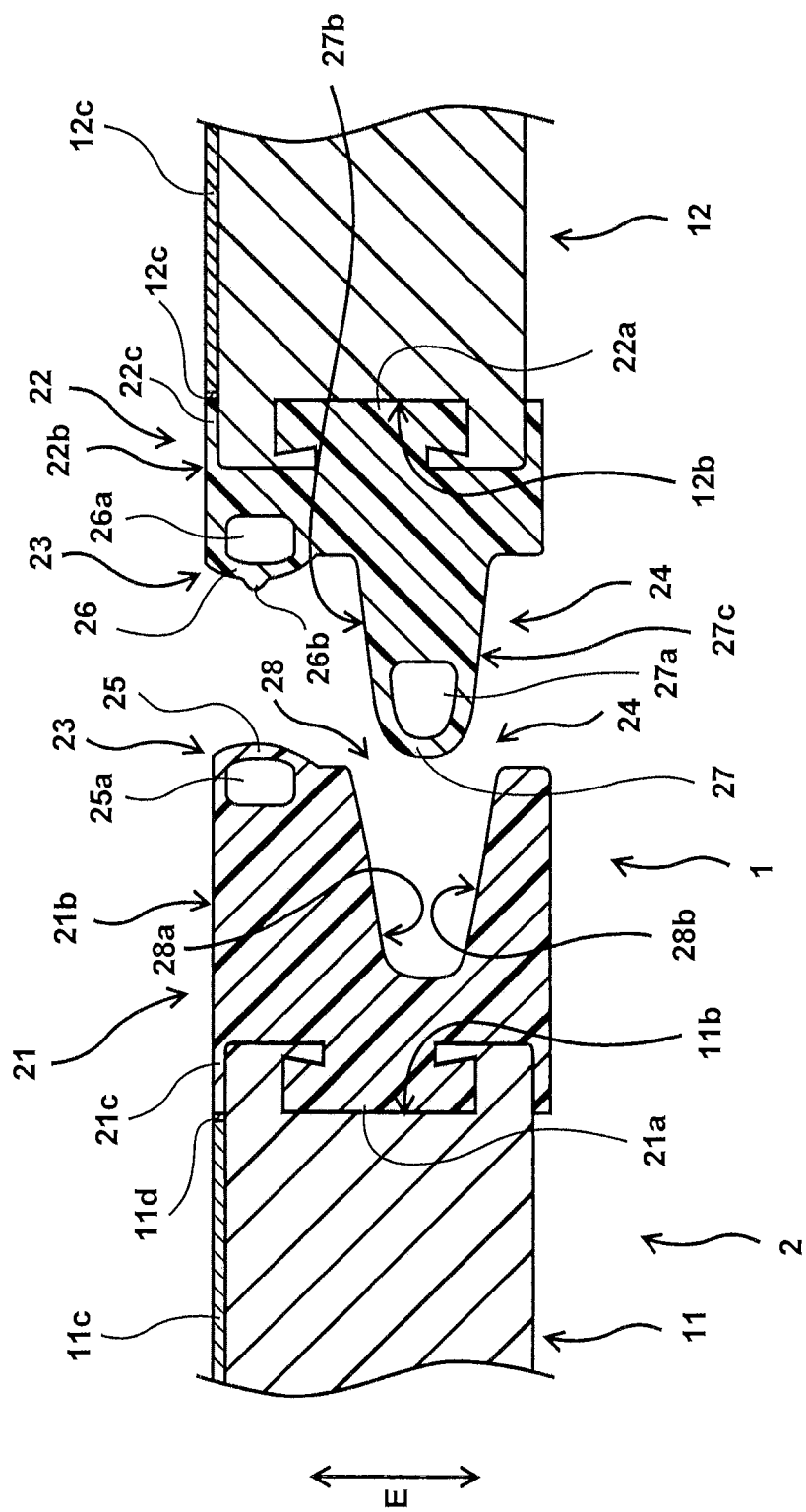
FIG. 2 is a schematic view along the arrows 2-2 in FIG. 1, showing a section of the vehicle door seal and a section of a part of the vehicle door shown in FIG. 1, wherein a first seal member and a second seal member of the vehicle door seal are separated.

FIG. 2 is a schematic view showing a section of the vehicle door seal 1 and a section of a part of the vehicle door 2, both shown in FIG. 1. FIG. 2 shows a view along the arrows 2-2 in FIG. 1, wherein the first seal member 21 and the second seal member 22 of the vehicle door seal 1 are separated from each other.

(First Seal Member)

The first seal member 21 shown in FIGS. 1 and 2 may be a rubber strip extending straight. For example, the first seal member 21 may be made of a rubber material such as ethylene-propylene rubber (EPDM) or chloroprene (CR). Also, the first seal member 21 may be embodied with a resin material.

The first seal member 21 may be installed on the first door leaf 11 of this embodiment at the door end thereof serving as the closing end. The first seal member 21 may be provided with an engaging portion 21a extending along the straight longitudinal direction thereof. The door end of the door leaf 11 may be provided with an engagement groove 11b extending vertically and engaged with the engaging portion 21a fitted thereinto. The first seal member 21 may have the engaging portion 21a thereof fitted into the engaging groove 11b and thus may be mounted on the door end of the door leaf 11. Thus, the first seal member 21 may be installed on the door leaf 11 so as to extend vertically. The bottom of the engaging groove 11b may constitute a counter surface facing the door end of the door leaf 12.

Figure 3:
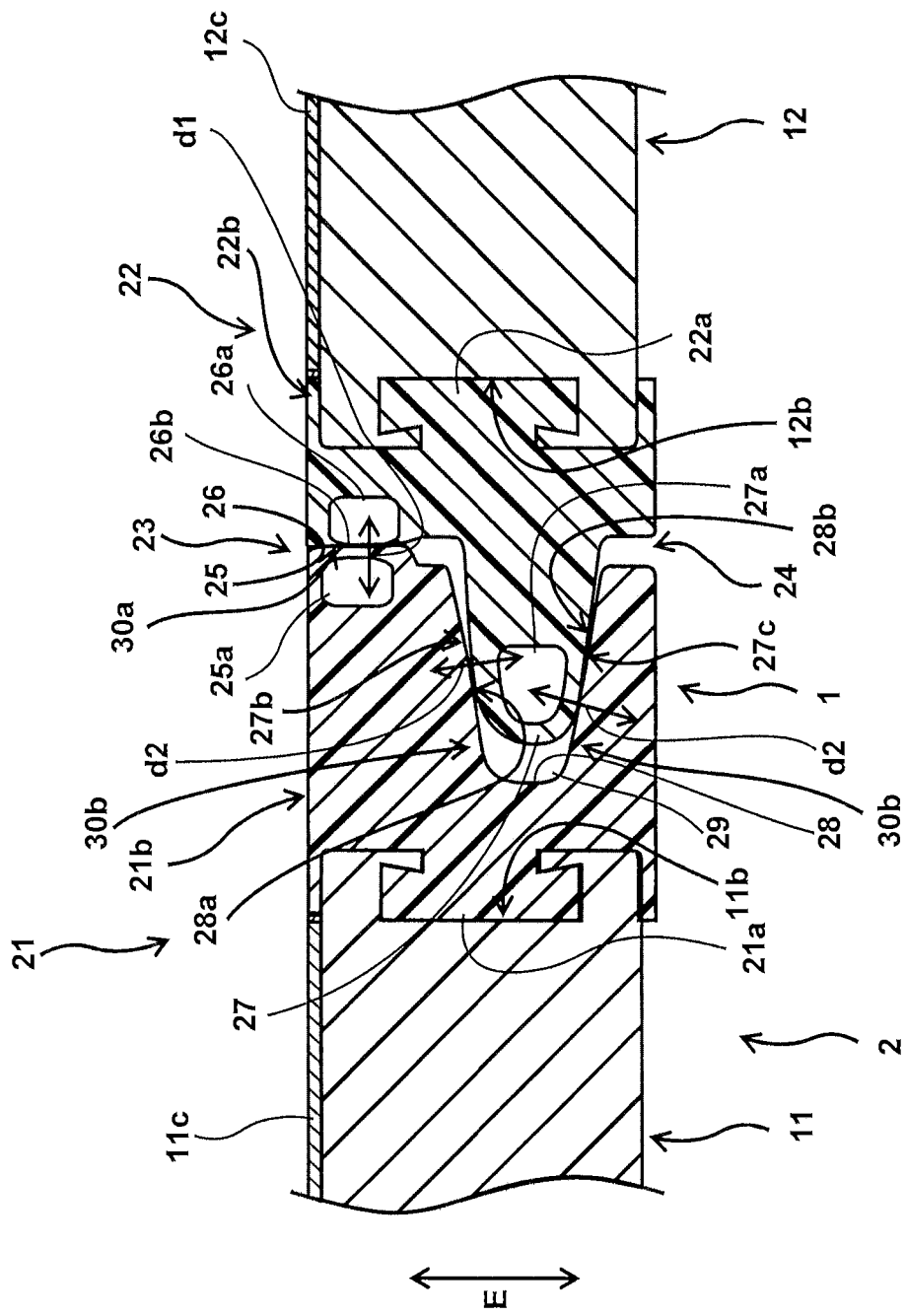
FIG. 3 shows the first seal member and the second seal member shown in FIG. 2 that contact each other.

The first outer surface 21b of the first seal member 21 on the widthwise outer side of the vehicle 100 may be a flat surface arranged in parallel with the front-rear direction and the top-bottom direction of the vehicle 100. In FIG. 2, the widthwise direction of the vehicle 100 (hereinafter also referred to simply as "widthwise") is represented by the bidirectional arrow E (which is also shown in FIG. 3). Thus, the first outer surface 21b may extend vertically on the widthwise outer side of the first seal member 21.

The first outer surface 21b of the first seal member 21 may include an outer surface edge portion 21c which may be placed on the widthwise outer side of the edge of the widthwise outer surface at the door end of the door leaf 11. On the door leaf 11, there may be provided an outer plate 11c in a thin tabular shape so as to cover the portion of widthwise outer surface other than the window 11a. In addition, a caulking material 11d may be filled in the gap between the edge of the outer plate 11c and the outer surface edge portion 21c. The caulking material 11d may be various packing materials that can be filled into the gap. The caulking material may also be referred to as a sealing material. The outer plate 11c may not cover the entirety of the portion of the widthwise outer surface other than the window 11a. The outer plate 11c eliminates a step between the outer surface edge portion 21c of the first seal member 21 and the door leaf 11. Thus, the outer plate 11c may be provided on at least the portion of the door leaf 11 to be contacted with the doorway seal 102.

(Second Seal Member)

The second seal member 22 shown in FIGS. 1 and 2 may be a rubber strip extending straight. For example, the second seal member 22 may be made of a rubber material such as ethylene-propylene rubber (EPDM) or chloroprene (CR). Also, the second seal member 22 may be embodied with a resin material.

The second seal member 22 may be installed on the second door leaf 12 of this embodiment at the door end thereof serving as the closing end. The second seal member 22 may be provided with an engaging portion 22a extending along the straight longitudinal direction thereof. The door end of the door leaf 12 may be provided with an engagement groove 12b extending vertically and engaged with the engaging portion 22a fitted thereinto. The second seal member 22 may have the engaging portion 22a thereof fitted into the engaging groove 12b and thus may be mounted on the door end of the door leaf 12. Thus, the second seal member 22 may be installed on the door leaf 12 so as to extend vertically. The bottom of the engaging groove 12b may constitute a counter surface facing the door end of the door leaf 11.

The second outer surface 22b of the second seal member 22 on the widthwise outer side may be a flat surface arranged in parallel with the front-rear direction and the top-bottom direction of the vehicle 100. Thus, the second outer surface 22b may extend vertically on the widthwise outer side of the second seal member 22.

The second outer surface 22b of the second seal member 22 may include an outer surface edge portion 22c which may be placed on the widthwise outer side of the edge of the widthwise outer surface at the door end of the door leaf 12. On the door leaf 12 may be provided an outer plate 12c in a thin tabular shape so as to cover the portion of widthwise outer surface other than the window 12a. In addition, a caulking material 12d may be filled in the gap between the edge of the outer plate 12c and the outer surface edge portion 22c. The caulking material 12d may be various packing materials that can be filled into the gap. The caulking material may also be referred to as a sealing material. The outer plate 12c may not cover the entirety of the portion of the widthwise outer surface other than the window 12a. The outer plate 12c eliminates a step between the outer surface edge portion 22c of the second seal member 22 and the door leaf 12. Thus, the outer plate 12c may be provided on at least the portion of the door leaf 12 to be contacted with the doorway seal 102.

FIG. 3 shows the pair of door leaves 11, 12 closing and the first seal member 21 and the second seal member 22 contacting with each other. That is, FIG. 3 is a schematic view showing a section of the vehicle door seal 1 and a section of a part of the vehicle door 2 as viewed along the arrows 2-2 of FIG. 1 when the doorway 101 is closed. As shown in FIG. 3, when the doorway 101 is closed, the first outer surface 21b and the second outer surface 22b may be arranged along the same plane parallel to the front-rear direction and the top-bottom direction of the vehicle 100.

Further, as shown in FIGS. 2 and 3, the first seal member 21 and the second seal member 22 may be provided with a first seal mechanism 23 and a second seal mechanism 24. The first seal mechanism 23 may be positioned on the widthwise outer side of the second seal mechanism 24.

(First Seal Mechanism)

The first seal mechanism 23 may include first projections 25, 26 extending vertically and projected on at least one of the first seal member 21 and the second seal member 22. In the first seal mechanism 23 of this embodiment, both the first seal member 21 and the second seal member 22 may be provided with a first projection. The first seal member 21 may be provided with the first projection 25. The second seal member 22 may be provided with the first projection 26. The first projection 25 may be provided as a first seal portion of the door leaf 11. The first projection 26 may be provided as a second seal portion that contacts with the first projection 25 as the first seal portion when the doorway is closed (that is, when the door leaves 11, 12 are closed).

The first projection 25 may be provided in the first seal member 21 on the opposite side to the engaging portion 21a. The first projection 25 may be positioned in the widthwise outer side of the first seal member 21 and projected toward the door end side, that is, toward the door leaf 12. Further, the first projection 25 may extend in the longitudinal direction of the first seal member 21. In the first projection 25 of the first seal member 21 may be defined a space 25a. The space 25a may extend along the longitudinal direction of the first seal member 21 so as to correspond to the first projection 25.

The first projection 26 may be provided in the second seal member 22 on the opposite side to the engaging portion 22a. The first projection 26 may be positioned in the widthwise outer side of the second seal member 22 and projected toward the door end side, that is, toward the door leaf 11. Further, the first projection 26 may extend in the longitudinal direction of the second seal member 22. In the first projection 26 of the second seal member 22 may be defined a space 26a. The space 26a may extend along the longitudinal direction of the second seal member 22 so as to correspond to the first projection 26.

The first projection 26 may be provided, at the peak portion thereof projecting toward the door leaf 11, with a small ridge 26b further projecting toward the door leaf 11. The ridge 26b may extend in the longitudinal direction of the second seal member 22.

As shown in FIG. 3, when the doorway 101 is closed and the first seal member 21 and the second seal member 22 contact each other at the first projections 25, 26, the first seal mechanism 23 may tightly seal between the first seal member 21 and the second seal member 22. That is, when the pair of door leaves 11, 12 are closed and thus the doorway 101 is closed, the first projection 25 provided in the first seal member 21 and the ridge 26b of the first projection 26 provided in the second seal member 22 contact each other, thereby sealing between the first seal member 21 and the second seal member 22.

When the first projection 25 provided on the first seal member 21 and the first projection 26 provided on the second seal member 22 contact each other, the first projection 25 and the first projection 26 are elastically deformed. The first projection 25 may be compressed against the door leaf 11. In the first projection 25, the part defining the space 25a may be deformed more than other parts. On the other hand, the first projection 26 may be compressed against the door leaf 12. In the first projection 26, the part defining the space 26a may be deformed more than other parts. Thus, when the first projection 25 and the first projection 26 are elastically deformed, the first seal member 21 and the second seal member 22 may contact more tightly with each other in the front-rear direction of the vehicle 100. Simultaneously, as shown in FIG. 3, a first contact surface 30a may be formed by the contacting part of the first projections 25, 26 and the contacting part of the first projection 25 and the ridge 26b. The contacting direction d1 of the first contact surface 30a (the direction perpendicular to the direction in which the first contact surface 30a spreads) may be along the direction of movement of the door leaves 11, 12 (the front-rear direction of the vehicle).

(Second Seal Mechanism)

The second seal mechanism 24 may be provided with a second projection 27 and a recess 28. The second projection 27 may be provided on any one of the first seal member 21 and the second seal member 22. The recess 28 may be provided in the other of the first seal member 21 and the second seal member 22. In the second seal mechanism 24 of this embodiment, the second projection 27 may be provided on the second seal member 22, and the recess 28 may be provided on the first seal member 21. The recess 28 may be provided as a third seal portion of the door leaf 11. The second projection 27 may be provided as a fourth seal portion that contacts the recess 28 as the third seal portion when the doorway is closed (that is, when the door leaves 11, 12 are closed).

The second projection 27 may be provided on the second seal member 22 on the opposite side to the engaging portion 22a. The second projection 27 may be positioned in the widthwise inner side of the second seal member 22 and projected toward the door end side, that is, toward the door leaf 11. Further, the second projection 27 may extend in the longitudinal direction of the second seal member 22. That is, the second projection 27 may extend in the vertical direction.

The second projection 27, which is on the second seal member 22, may be positioned on the widthwise inner side of the first projection 26. The second projection 27 may project toward the door leaf 11 more than the first projection 26. In the tip end portion of the second projection 27 projecting toward the door leaf 11, the section perpendicular to the vertical direction may have an arcuate outer shape. Further, both widthwise side surfaces of the second projection 27 may be tapered down toward the door leaf 11 to form tapered surfaces 27b, 27c.

In the second projection 27 of the second seal member 22 may be defined a space 27a, which may be positioned in the tip end portion projecting toward the door leaf 11. The space 27a may extend along the longitudinal direction of the second seal member 22 so as to correspond to the second projection 27.

The recess 28 may be provided in the first seal member 21 on the opposite side to the engaging portion 21a. The recess 28 may be positioned in the widthwise inner side of the first seal member 21 and recessed like a groove toward the engaging portion 21a, that is, toward the door leaf 11. Further, the recess 28 may extend like a groove in the longitudinal direction of the first seal member 21. That is, the recess 28 may extend like a groove in the vertical direction.

The recess 28, which is in the first seal member 21, may be positioned on the widthwise inner side of the first projection 25. In the recess 28, both widthwise side surfaces constituting inner wall surfaces 28a, 28b may converge toward the engaging portion 21a so as to gradually narrow the inner region of the recess 28. That is, the recess 28 is wider in the inlet side (close to the door leaf 12) and narrower in the interior (close to the door leaf 11). Additionally, the inner wall surfaces 28a, 28b may be formed so as to be inclined slightly in the interior of the recess 28 and largely in the inlet side of the recess 28, with respect to the front-rear direction of the vehicle.

As shown in FIG. 3, when the doorway 101 is closed and the second projection 27 contacts with the recess 28 inside the recess 28, the second seal mechanism 24 may tightly seal between the second projection 27 and the recess 28. That is, when the pair of door leaves 11, 12 are closed and thus the doorway 101 is closed, the recess 28 provided in the first seal member 21 and the second projection 27 provided in the second seal member 22 contact each other, thereby sealing between the first seal member 21 and the second seal member 22.

When the doorway 101 is closed, the tip end portion of the second projection 27 projecting toward the door leaf 11 may be inserted into the recess 28. Further, when the doorway 101 is closed, the second projection 27 may contact the recess 28 at both widthwise side surfaces thereof. More specifically, when the doorway 101 is closed, the tapered surface 27b of the second projection 27 on the widthwise outer side may contact the inner wall surface 28a of the recess 28 on the widthwise outer side. On the other hand, the tapered surface 27c of the second projection 27 on the widthwise inner side may contact the inner wall surface 28b of the recess 28 on the widthwise inner side. In addition, the second projection 27 should preferably contact the inner wall surface 28a of the recess 28 at a portion of the tapered surface 27b aligning with the space 27a in the widthwise direction. Likewise, the second projection 27 should preferably contact the inner wall surface 28b of the recess 28 at a portion of the tapered surface 27c aligning with the space 27a in the widthwise direction.

The second seal mechanism 24 may be configured such that, when the doorway 101 is closed, the tip end portion of the second projection 27 projecting toward the door leaf 11 faces the recess 28 with a gap 29 maintained therebetween.

When the second projection 27 provided on the second seal member 22 and the recess 28 provided in the first seal member 21 contact each other, the second projection 27 may be elastically deformed more than the recess 28. Simultaneously, the tapered surfaces 27b, 27c of the second projection 27 may be under a load from the inner surfaces 28a, 28b of the recess 28, and thus the second projection 27 may be compressed toward widthwise inside thereof. The tapered surface 27b may be pressed widthwise inward by the inner wall surface 28a. The tapered surface 27c may be pressed widthwise outward by the inner wall surface 28b. In the second projection 27, the part defining the space 27a may be deformed more than other parts. Thus, particularly when the second projection 27 is elastically deformed, the first seal member 21 and the second seal member 22 may contact more tightly with each other in the widthwise direction. Simultaneously, as shown in FIG. 3, a second contact surface 30b may be formed by the contacting part of the second projection 27 and the recess 28. The contacting direction d2 of the second contact surface 30b (the direction perpendicular to the direction in which the second contact surface 30b spreads) may intersect the direction of movement of the door leaves 11, 12 (the front-rear direction of the vehicle) at about 90°.

As described above, in closing the doorway 101, the door leaves 11, 12 and the vehicle door seal 1 may be urged against the flat end surface of the doorway seal 102 on the widthwise inner side. At this time, the first outer surface 21b of the first seal member 21, which is a flat surface, may be urged against the flat surface of the doorway seal 102 on the widthwise inner side. The second outer surface 22b of the second seal member 22, which is a flat surface, may be urged against the flat surface of the doorway seal 102 on the widthwise inner side.

(Effect of Vehicle Door Seal and Vehicle Door)

According to this embodiment as described above, when the doorway 101 is closed, the first seal member 21 and the second seal member 22 contact each other at the first projections 25, 26 of the first seal mechanism 23, thereby tightly sealing between the seal members. Thus, there is no sudden increase or decrease of atmospheric pressure in the vehicle at least if the atmospheric pressure difference between outside and inside of the vehicle 100 is small enough. Further, according to this embodiment, the first seal member 21 and the second seal member 22 may be provided with the second seal mechanism 24, in addition to the first seal mechanism 23.

The second seal mechanism 24 may be configured such that, when the doorway 101 is closed, the second projection 27 contacts the recess 28 at both widthwise side surfaces thereof so as to seal between the second projection 27 and the recess 28. Thus, even when the atmospheric pressure difference between outside and inside of the vehicle 100 is suddenly increased, the second projection 27 may be strongly urged against the recess 28 from the higher pressure side to the lower pressure side. This arrangement efficiently inhibits the air from passing between the second projection 27 and the recess 28. As a result, sudden increases and decreases of the atmospheric pressure in the vehicle may be suppressed. The unpleasant sensation to ears of people in the vehicle may be suppressed.

Further, the second seal mechanism 24 may be configured such that, when the doorway 101 is closed, the tip end portion of the second projection 27 faces the recess 28 with a gap 29 maintained therebetween. Thus, it can be ensured that, when the doorway 101 is closed, the second projection 27 may contact the recess 28 at both widthwise side surfaces thereof.

According to this embodiment, the two seal mechanisms (the first seal mechanism 23 and the second seal mechanism 24) are positioned separately in the widthwise direction of the door, and thus each of the seal mechanisms 23, 24 may be deformed with no impact on the deformation of the other. Therefore, the tightness of the door can be increased.

According to this embodiment, the first contact surface 30a between the first projections 25, 26 of the first seal mechanism 23 may have a different direction than the second contact surface 30b between the second projection 27 and the recess 28 of the second seal mechanism 24. Thus, for example, even if it is difficult to maintain the tightness of one of the contact surfaces 30a, 30b in connection with the atmospheric pressure inside and outside the door, the other of the contact surfaces 30a, 30b can retain the tightness.

As described above, this embodiment provides a vehicle door seal 1 and a vehicle door 2 that suppress sudden increases and decreases of the atmospheric pressure in the vehicle even when the atmospheric pressure difference between outside and inside of the vehicle 100 is suddenly increased.

According to this embodiment, the direction d1 of the first contact surface 30a may be along the moving direction of the door, whereas the direction d2 of the second contact surface 30b may intersect the moving direction of the door. Therefore, a certain degree of tightness can be ensured at the first contact surface 30a with the force to close the door; and even if the tightness cannot be maintained at the first contact surface 30a due to presence of a foreign matter such as dust, the tightness can be ensured at the second contact surface 30b.

According to this embodiment, the first seal mechanism 23, wherein the first projections 25, 26 contact each other to tightly seal between the first seal member 21 and the second seal member 22, may be positioned on the widthwise outer side of the second seal mechanism 24. Thus, when the doorway 101 of the vehicle 100 is closed, foreign matters can be surely prevented from entering the vehicle 100 from outside.

According to this embodiment, when the doorway 101 of the vehicle 100 is closed, the first outer surface 21b of the first seal member 21 and the second outer surface 22b of the second seal member 22, both being flat surfaces, may be coplanar with each other. Thus, it is less likely to have a gap between the doorway 101 of the vehicle 100, and the first seal member 21 and the second seal member 22. In particular, since the door structure of this embodiment configured such that the door leaves 11, 12 are urged against the doorway 101 of the vehicle 100, it is possible to tightly seal between the doorway 101 of the vehicle 100, and the first seal member 21 and the second seal member 22 more efficiently.

According to this embodiment, the outside air tends to flow along the gap formed between the second projection 27 and the recess 28; therefore, the flow path of the air can be elongated without thickening the door, thereby to increase the "conduit resistance." Thus, the tightness of the door can be increased without changing the thickness of the door.

According to this embodiment, the second seal mechanism 24 may be configured such that, when the doorway 101 is closed, the second projection 27 may contact the recess 28 at both widthwise side surfaces thereof. Thus, when the doorway 101 is closed, the first outer surface 21b of the first seal member 21 and the second outer surface 22b of the second seal member 22 can be positioned easily. That is, it can be ensured that the first outer surface 21b and the second outer surface 22b be positioned in the same plane.

Second Embodiment (Vehicle Door)

Figure 4:
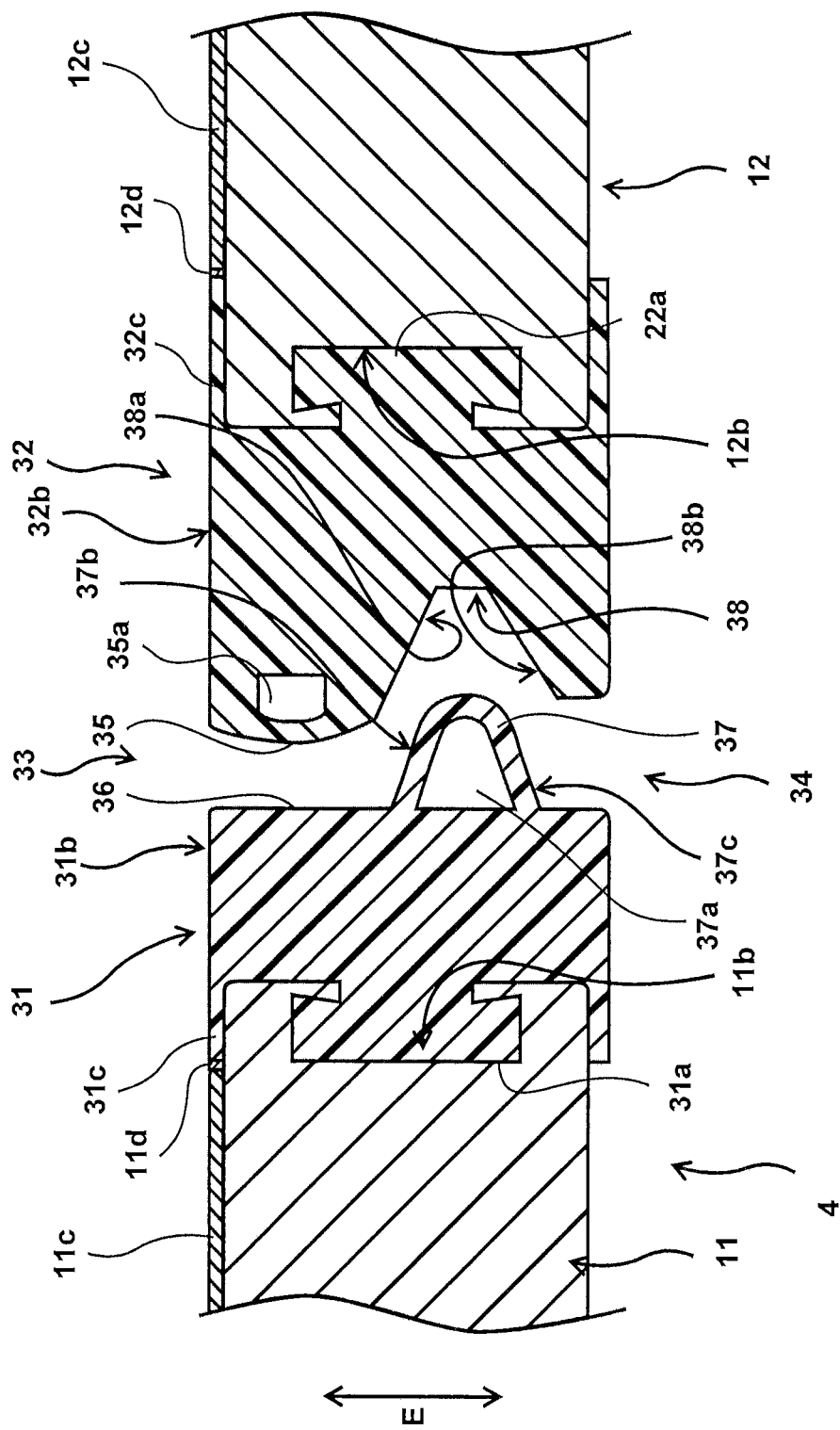
FIG. 4 is a schematic view showing a section of the vehicle door seal and a section of a part of the vehicle door according to a second embodiment of the present invention.

Next, a vehicle door seal 3 and a vehicle door 4 according to the second embodiment of the present invention will now be described. FIG. 4 is a schematic view showing a section of the vehicle door seal 3 and a section of a part of the vehicle door 4. In the following description, the elements configured in the same manner as in the first embodiment will be merely denoted by the same reference numeral in the drawing as in the first embodiment or referred to with the same reference numeral as in the first embodiment, and the description therefor will be omitted unless required.

The vehicle door 4 may be installed on the vehicle 100 such as a railway vehicle and may constitute a double-leaf biparting door structure including a pair of door leaves 11, 12. The vehicle door 4 may include a pair of door leaves 11, 12 and a vehicle door seal 3. The pair of door leaves 11, 12 may be configured in the same matter as in the first embodiment. The pair of door leaves 11, 12 may be opened and closed by a door driving device 103. The pair of door leaves 11, 12 may be connected to the door driving device 103 via a pair of door hangers 104a, 104b.

(Vehicle Door Seal)

Next, a vehicle door seal 3 according to the second embodiment of the present invention will now be described. The vehicle door seal 3 shown in FIG. 4 may seal between the ends of the pair of door leaves 11, 12 when the doorway 101 of the vehicle 100 is closed. The vehicle door seal 3 may be installed on the ends of the pair of door leaves 11, 12. The vehicle door seal 3 may include a first seal member 31 and a second seal member 32. FIG. 4 shows horizontal sections of the first seal member 31 and the second seal member 32 separated from each other.

(First Seal Member)

The first seal member 31 shown in FIG. 4 may be a rubber strip extending straight. For example, the first seal member 31 may be made of a rubber material such as ethylene-propylene rubber (EPDM) or chloroprene (CR). Also, the first seal member 31 may be embodied with a resin material.

The first seal member 31 may be installed on the first door leaf 11 of this embodiment at the door end thereof serving as the closing end. The first seal member 31 may be provided with an engaging portion 31a extending along the straight longitudinal direction thereof. The engaging portion 31a may be configured in the same manner as the engaging portion 21a of the first seal member 21 of the first embodiment. The engaging portion 31a may be fitted into an engaging groove 11b of the door leaf 11 and thus may be mounted on the door end of the door leaf 11. Thus, the first seal member 31 may be installed on the door leaf 11 so as to extend vertically.

Figure 5:
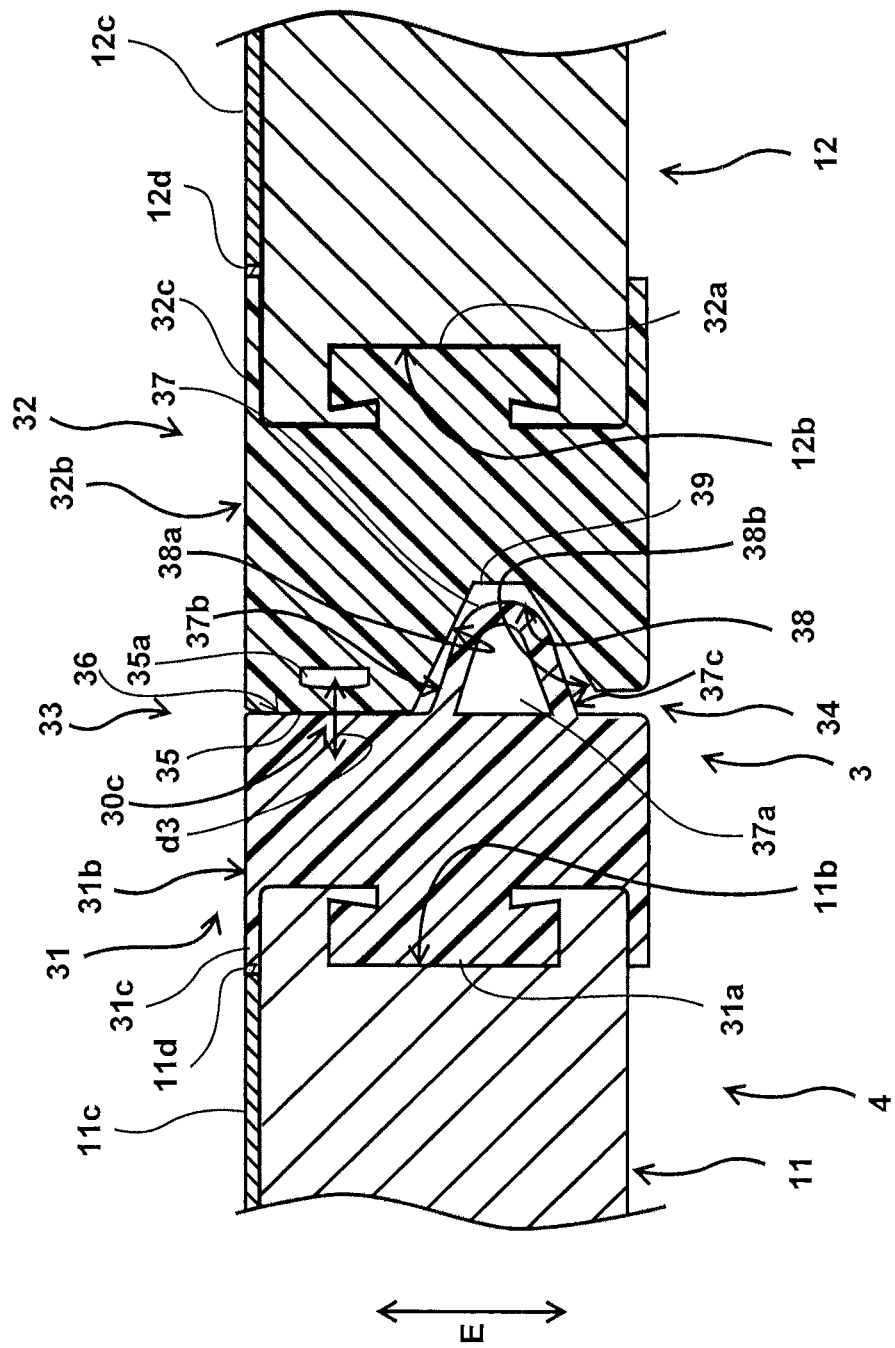
FIG. 5 shows an example of the first seal member and the second seal member shown in FIG. 4 that contact each other.
Figure 6:
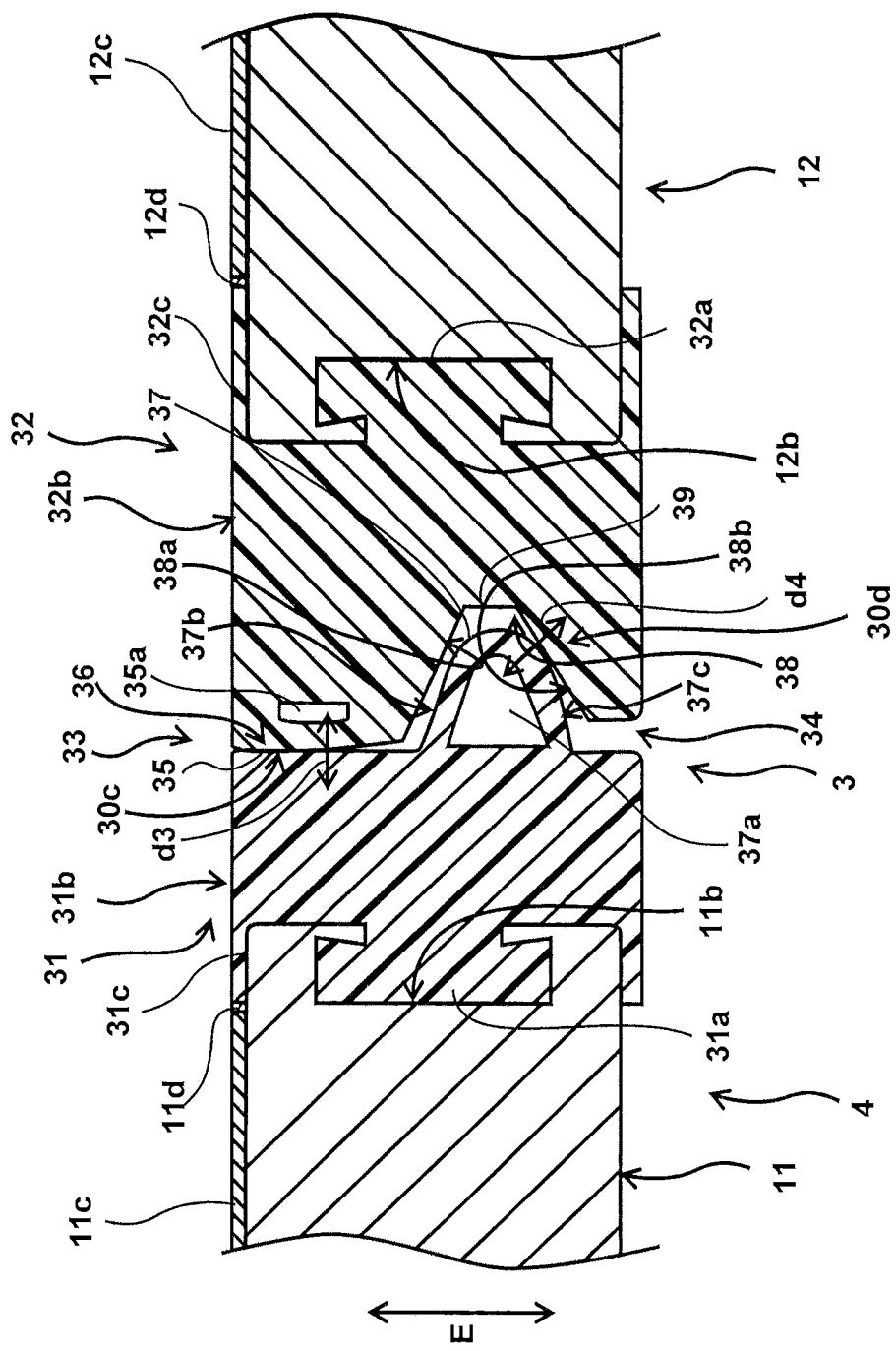
FIG. 6 shows another example of the first seal member and the second seal member shown in FIG. 4 that contact each other.
Figure 7:
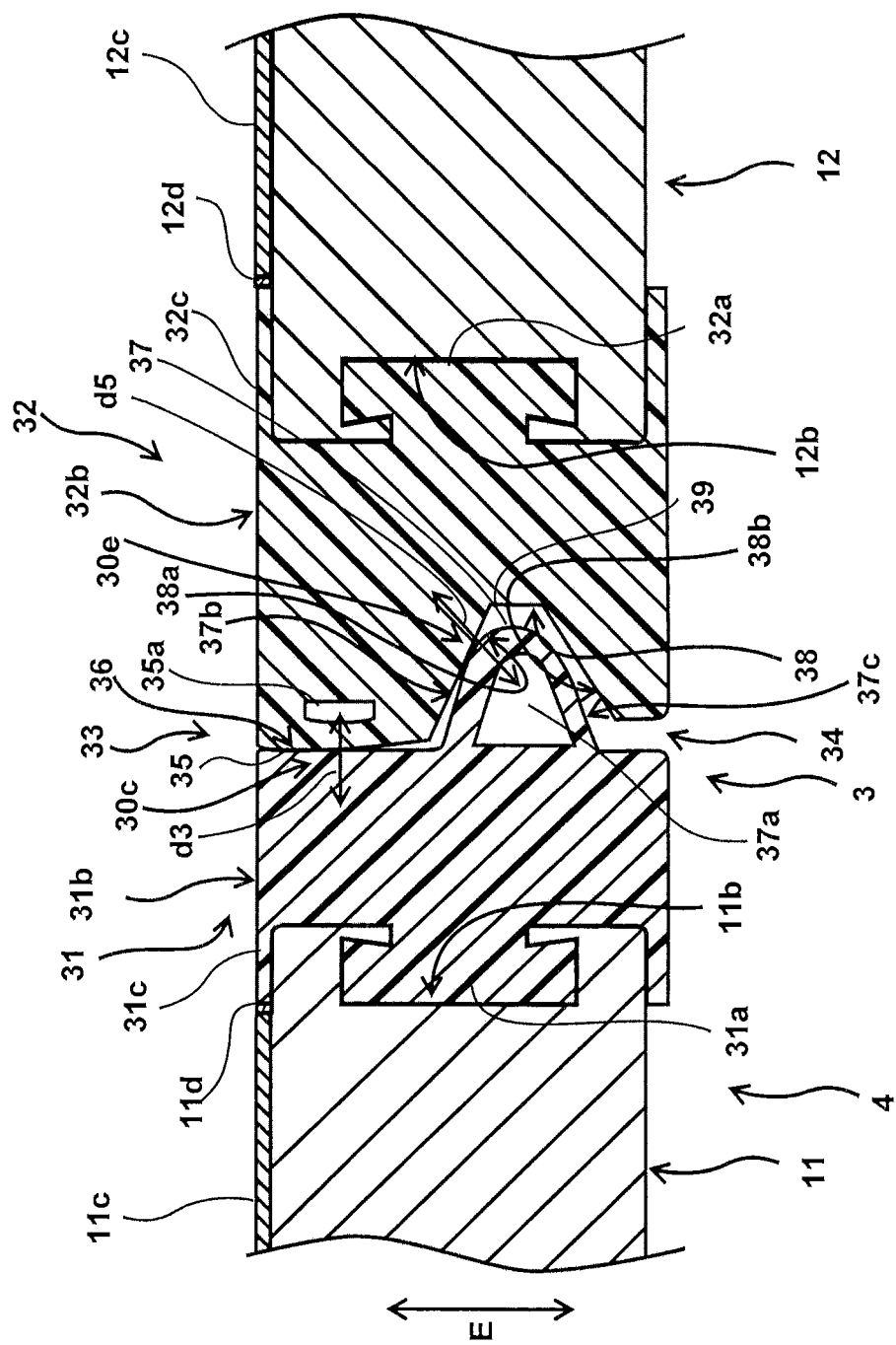
FIG. 7 shows still another example of the first seal member and the second seal member shown in FIG. 4 that contact each other.

The first outer surface 31b of the first seal member 31 on the widthwise outer side of the vehicle 100 may be a flat surface arranged in parallel with the front-rear direction and the top-bottom direction of the vehicle 100. In FIG. 4, the widthwise direction of the vehicle 100 (hereinafter also referred to simply as "widthwise") is represented by the bidirectional arrow E (which is also shown in FIGS. 5 to 7). Thus, the first outer surface 31b may extend vertically on the widthwise outer side of the first seal member 31.

The first outer surface 31b of the first seal member 31 may include an outer surface edge portion 31c which may be placed on the widthwise outer side of the edge of the widthwise outer surface at the door end of the door leaf 11. In addition, a caulking material 11d may be filled in the gap between the outer surface edge portion 31c and the edge of the outer plate 11c. The outer plate 11c eliminates a step between the outer surface edge portion 31c of the first seal member 31 and the door leaf 11. Thus, the outer plate 11c may be provided on at least the portion of the door leaf 11 to be contacted with the doorway seal 102.

(Second Seal Member)

The second seal member 32 shown in FIG. 4 may be a rubber strip extending straight. For example, the second seal member 32 may be made of a rubber material such as ethylene-propylene rubber (EPDM) or chloroprene (CR). Also, the second seal member 32 may be embodied with a resin material.

The second seal member 32 may be installed on the second door leaf 12 of this embodiment at the door end thereof serving as the closing end. The second seal member 32 may be provided with an engaging portion 32a extending along the straight longitudinal direction thereof. The engaging portion 32a may be configured in the same manner as the engaging portion 22a of the second seal member 22 of the first embodiment. The engaging portion 32a may be fitted into an engaging groove 12b of the door leaf 12 and thus may be mounted on the door end of the door leaf 12. Thus, the second seal member 32 may be installed on the door leaf 12 so as to extend vertically.

The second outer surface 32b of the second seal member 32 on the widthwise outer side may be a flat surface arranged in parallel with the front-rear direction and the top-bottom direction of the vehicle 100. Thus, the second outer surface 32b may extend vertically on the widthwise outer side of the second seal member 32.

The second outer surface 32b of the second seal member 32 may include an outer surface edge portion 32c which may be placed on the widthwise outer side of the edge of the widthwise outer surface at the door end of the door leaf 12. In addition, a caulking material 12d may be filled in the gap between the outer surface edge portion 32c and the edge of the outer plate 12c. The outer plate 12c eliminates a step between the outer surface edge portion 32c of the second seal member 32 and the door leaf 12. Thus, the outer plate 12c may be provided on at least the portion of the door leaf 12 to be contacted with the doorway seal 102.

FIG. 5 shows the pair of door leaves 11, 12 closing and the first seal member 31 and the second seal member 32 contacting with each other. That is, FIG. 5 is a schematic view showing a section of the vehicle door seal 3 and a section of a part of the vehicle door 4 as viewed when the doorway 101 is closed. As shown in FIG. 5, when the doorway 101 is closed, the first outer surface 31b and the second outer surface 32b may be arranged along the same plane parallel to the front-rear direction and the top-bottom direction of the vehicle 100. FIG. 5 shows one example of the first seal member 31 and the second seal member 32 that contact each other.

Further, as shown in FIGS. 4 and 5, the first seal member 31 and the second seal member 32 may be provided with a first seal mechanism 33 and a second seal mechanism 34. The first seal mechanism 33 may be positioned on the widthwise outer side of the second seal mechanism 34.

(First Seal Mechanism)

The first seal mechanism 33 may include a first projection 35 extending vertically and projected on at least one of the first seal member 31 and the second seal member 32. In the first seal mechanism 33 of this embodiment, the first projection 35 may be provided on the second seal member 32, which is one of the first and second seal members 31, 32. The first seal mechanism 33 may also include a flat portion 36 provided on the first seal member 31, in addition to the first projection 35 provided on the second seal member 32. The flat portion 36 may be provided as a first seal portion of the door leaf 11. The first projection 35 may be provided as a second seal portion that contacts with the flat portion 36 as the first seal portion when the doorway is closed (that is, when the door leaves 11, 12 are closed).

The first projection 35 may be provided on the second seal member 32 on the opposite side to the engaging portion 32a. The first projection 35 may be positioned on the widthwise outer side of the second seal member 32 and projected toward the door end side, that is, toward the door leaf it. Further, the first projection 35 may extend in the longitudinal direction of the second seal member 32. In the first projection 35 of the second seal member 32 may be defined a space 35a. The space 35a may extend along the longitudinal direction of the second seal member 32 so as to correspond to the first projection 35.

The flat portion 36 may be provided on the first seal member 31 on the opposite side to the engaging portion 31a. The flat portion 36 may be positioned on the widthwise outer side of the first seal member 31 and may constitute a flat surface perpendicular to the front-rear direction of the vehicle 100. Further, the flat portion 36 may extend in the longitudinal direction of the first seal member 31. When the doorway 101 is closed, the flat portion 36 provided on the first seal member 31 may contact the first projection 35 of the second seal member 32.

As shown in FIG. 5, when the doorway 101 is closed and the first seal member 31 and the second seal member 32 contact each other at the first projection 35, the first seal mechanism 33 may tightly seal between the first seal member 31 and the second seal member 32. That is, when the pair of door leaves 11, 12 are closed and thus the doorway 101 is closed, the flat portion 36 provided on the first seal member 31 and the first projection 35 provided on the second seal member 32 contact each other, thereby sealing between the first seal member 31 and the second seal member 32.

When the flat portion 36 provided on the first seal member 31 and the first projection 35 provided on the second seal member 32 contact each other, the first projection 35 may be elastically deformed more than the flat portion 36. The first projection 35 may be compressed against the door leaf 12. In the first projection 35, the part defining the space 35a may be deformed more than other parts. Thus, particularly when the first projection 35 is elastically deformed, the first seal member 31 and the second seal member 32 may contact more tightly with each other in the widthwise direction of the vehicle 100. Simultaneously, as shown in FIG. 5, a first contact surface 30c may be formed by the contacting part of the first projection 35 and the flat portion 36. The contacting direction d3 of the first contact surface 30c (the direction perpendicular to the direction in which the first contact surface 30c spreads) may be along the direction of movement of the door leaves 11, 12 (the front-rear direction of the vehicle).

(Second Seal Mechanism)

The second seal mechanism 34 may be provided with a second projection 37 and a recess 38. The second projection 37 may be provided on any one of the first seal member 31 and the second seal member 32. The recess 38 may be provided in the other of the first seal member 31 and the second seal member 32. In the second seal mechanism 34 of this embodiment, the second projection 37 may be provided on the first seal member 31, and the recess 38 may be provided in the second seal member 32. The second projection 37 may be provided as a third seal portion of the door leaf 11. The recess 38 may be provided as a fourth seal portion that can contact the second projection 37 as the third seal portion when the doorway is closed (that is, when the door leaves 11, 12 are closed).

The second projection 37 may be provided on the first seal member 31 on the opposite side to the engaging portion 31a. The second projection 37 may be positioned in the widthwise inner side of the first seal member 31 and projected toward the door end side, that is, toward the door leaf 12. Further, the second projection 37 may extend in the longitudinal direction of the first seal member 31. That is, the second projection 37 may extend in the vertical direction.

The second projection 37, which is on the first seal member 31, may be positioned on the widthwise inner side of the flat portion 36. In the tip end portion of the second projection 37 projecting toward the door leaf 12, the section perpendicular to the vertical direction may have an arcuate outer shape. Further, both widthwise side surfaces of the second projection 37 may be tapered down toward the door leaf 12 to form tapered surfaces 37b, 37c.

In the second projection 37 of the second seal member 32, there may be defined a space 37a. The space 37a may extend along the longitudinal direction of the first seal member 31 so as to correspond to the second projection 37. For example, the second projection 37 may be configured such that the outer shape thereof is substantially similar to the inner shape of the space 37a in a horizontal section.

The recess 38 may be provided in the second seal member 32 on the opposite side to the engaging portion 32a. The recess 38 may be positioned in the widthwise inner side of the second seal member 32 and recessed like a groove toward the engaging portion 32a, that is, toward the door leaf 12. Further, the recess 38 may extend like a groove in the longitudinal direction of the second seal member 32. That is, the recess 38 may extend like a groove in the vertical direction.

The recess 38, which is in the second seal member 32, may be positioned on the widthwise inner side of the first projection 35. In the recess 38, both widthwise side surfaces constituting inner wall surfaces 38a, 38b may converge toward the engaging portion 32a so as to gradually narrow the inner region of the recess 38. That is, the recess 38 is wider in the inlet side (close to the door leaf 11) and narrower in the interior (close to the door leaf 12). Additionally, the inner wall surfaces 38a, 38b may be formed so as to be inclined slightly more than the tapered surfaces 37a, 37b of the second projection 37, with respect to the front-rear direction of the vehicle 100.

FIG. 6 shows another example different from that of FIG. 5, wherein when the doorway 101 is closed, the first seal member 31 and the second seal member 32 contact each other. FIG. 7 shows still another example different from those of FIGS. 5 and 6, wherein when the doorway 101 is closed, the first seal member 31 and the second seal member 32 contact each other.

As shown in FIGS. 6 and 7, when the doorway 101 is closed and the second projection 37 contacts with the recess 38 at a portion in the recess 38, the second seal mechanism 34 may tightly seal between the second projection 37 and the recess 38. FIGS. 5 to 7 will hereinafter be explained, wherein the pair of door leaves 11, 12 are closed and thus the doorway 101 is closed.

When the doorway 101 is closed, as shown in FIG. 5, the second projection 37 may be inserted into the recess 28 toward the door leaf 12. In FIG. 5, the second projection 37 is not in contact with the recess 38. The gap between a side surface of the second projection 37 and a side surface of the recess 38 may have a width of, e.g., about 0.5 to 1 mm. When the atmospheric pressure difference between outside and inside of the vehicle 100 is suddenly increased, the second seal mechanism 34 may transfer from the state of FIG. 5 to the state of FIG. 6 or 7.

For example, when the vehicle 100 running at a high speed enters a tunnel, the pressure of the air outside the vehicle 100 may be suddenly increased as compared to the pressure of the air inside the vehicle. In such a circumstances, the high pressure air that passes the first seal mechanism 33 may act on the widthwise outer side of the second projection 37. That is, the high pressure air from outside the vehicle 100 may act on the tapered surface 37b of the second projection 37.

Thus, the second projection 37 may be elastically deformed so as to be slightly bent to the widthwise inner side. As a result, as shown in FIG. 6, the widthwise inner side of the second projection 37 may contact the recess 38 at a portion in the recess 38. Further, when the high pressure air from outside the vehicle 100 acts on the second projection 37, the widthwise inner side of the second projection 37 may be urged strongly against the widthwise inner side surface in the recess 38. That is, the second projection 37 may tightly contact the inner wall surface 38b of the recess 38 at the tapered surface 37c. Simultaneously, as shown in FIG. 6, a second contact surface 30d may be formed by the contacting parts of the side surface (the tapered surface 37c) of the second projection 37 and the side surface (the inner wall surface 38b) of the recess 38. The contacting direction d4 of the second contact surface 30d (the direction perpendicular to the direction in which the second contact surface 30d spreads) may intersect the direction of movement of the door leaves 11, 12 (the front-rear direction of the vehicle) at 45°.

For example, when the vehicle 100 running at a high speed goes out of a tunnel, the pressure of the air outside the vehicle 100 may be suddenly decreased as compared to the pressure of the air inside the vehicle. In such a circumstances, the high pressure air that acts from inside the vehicle 100 may act on the widthwise inner side of the second projection 37. That is, the high pressure air from inside the vehicle 100 may act on the tapered surface 37c of the second projection 37.

Thus, the second projection 37 may be elastically deformed so as to be slightly bent to the widthwise outer side. As a result, as shown in FIG. 7, the widthwise outer side of the second projection 37 may contact the recess 38 at a portion in the recess 38. Further, when the high pressure air from inside the vehicle 100 acts on the second projection 37, the widthwise outer side of the second projection 37 may be urged strongly against the widthwise outer side surface in the recess 38. That is, the second projection 37 may tightly contact the inner wall surface 38a of the recess 38 at the tapered surface 37b. Simultaneously, as shown in FIG. 7, a second contact surface 30e may be formed by the contacting parts of the side surface (the tapered surface 37b) of the second projection 37 and the side surface (the inner wall surface 38a) of the recess 38. The contacting direction d5 of the second contact surface 30e (the direction perpendicular to the direction in which the second contact surface 30e spreads) may intersect the direction of movement of the door leaves 11, 12 (the front-rear direction of the vehicle) at about 45°.

As described above, in the second seal mechanism 34, the second projection 37 faces the recess 38 in such a manner that, when the doorway 101 is closed, the second projection 37 is elastically deformed in accordance with the atmospheric pressure difference between outside and inside of the vehicle 100 and contacts with the recess 38 at one of both widthwise side surfaces of the recess 38. Additionally, when the doorway 101 is closed and the atmospheric pressure difference between outside and inside of the vehicle 100 is suddenly increased, the second projection 37 contacts with the recess 38 at a portion in the recess 38, and thus the second seal mechanism 34 may tightly seal between the second projection 37 and the recess 38. That is, in the above case, the second projection 37 provided on the first seal member 31 and the recess 38 provided in the second seal member 32 contact each other, thereby sealing between the first seal member 31 and the second seal member 32.

As shown in FIGS. 5 to 7, the second seal mechanism 34 may be configured such that, when the doorway 101 is closed, the tip end portion of the second projection 37 projecting toward the door leaf 12 faces the recess 38 with a gap 39 maintained therebetween.

When the doorway 101 is closed, the door leaves 11, 12 and the vehicle door seal 3 may be urged against the flat end surface of the doorway seal 102 on the widthwise inner side. At this time, the first outer surface 31b of the first seal member 31, which is a flat surface, may be urged against the flat surface of the doorway seal 102 on the widthwise inner side. The second outer surface 32b of the second seal member 32, which is a flat surface, may be urged against the flat surface of the doorway seal 102 on the widthwise inner side.

(Effect of Vehicle Door Seal and Vehicle Door)

According to this embodiment as described above, when the doorway 101 is closed, the first seal member 31 and the second seal member 32 contact each other at the first projection 35 of the first seal mechanism 33, thereby tightly sealing the seal members. Thus, there is no sudden increase or decrease of atmospheric pressure in the vehicle at least if the atmospheric pressure difference between outside and inside of the vehicle 100 is small enough. Further, according to this embodiment, the first seal member 31 and the second seal member 32 may be provided with the second seal mechanism 34, in addition to the first seal mechanism 33.

The second seal mechanism 34 may be configured such that, when the doorway 101 is closed, the second projection 37 is elastically deformed in accordance with the atmospheric pressure difference between outside and inside of the vehicle 100 and contacts with the recess 38 at one of both widthwise side surfaces of the recess 38, thereby creating a tight seal between the second projection 37 and the recess 38. Thus, even when the atmospheric pressure difference between outside and inside of the vehicle 100 is suddenly increased, the second projection 37 may be strongly urged against the recess 38 from the higher pressure side to the lower pressure side. This arrangement efficiently suppresses the air from passing between the second projection 37 and the recess 38. As a result, sudden increases and decreases of the atmospheric pressure in the vehicle may be suppressed. The unpleasant sensation to ears of people in the vehicle may be suppressed.

Further, the second seal mechanism 34 may be configured such that, when the doorway 101 is closed, the tip end portion of the second projection 37 faces the recess 38 with a gap 39 maintained therebetween. Therefore, it can be ensured that, when the doorway 101 is closed, the second projection 37 is elastically deformed in accordance with the atmospheric pressure difference between outside and inside of the vehicle 100 and contacts the recess 38 at one of both widthwise side surfaces of the recess 38.

As described above, this embodiment provides a vehicle door seal 3 and a vehicle door 4 that suppress sudden increases and decreases of the atmospheric pressure in the vehicle even when the atmospheric pressure difference between outside and inside of the vehicle 100 is suddenly increased.

According to this embodiment, the first seal mechanism 33, wherein the first projection 35 makes a contact to tightly seal the first seal member 31 and the second seal member 32, may be positioned on the widthwise outer side of the second seal mechanism 34. Thus, when the doorway 101 of the vehicle 100 is closed, foreign matters can be surely prevented from entering the vehicle 100 from outside.

According to this embodiment, when the doorway 101 of the vehicle 100 is closed, the first outer surface 31b of the first seal member 31 and the second outer surface 32b of the second seal member 32, both being flat surfaces, may be coplanar with each other. Thus, it is less likely to have a gap between the doorway 101 of the vehicle 100, and the first seal member 31 and the second seal member 32. In particular, since the door structure of this embodiment configured such that the door leaves 11, 12 are urged against the doorway 101 of the vehicle 100, it is possible to tightly seal the doorway 101 of the vehicle 100, and the first seal member 31 and the second seal member 32 more efficiently.

According to this embodiment, when an external force (e.g., the atmospheric pressure difference between the outside air and the inside air) imparted on the second seal mechanism 34 is increased and the second seal mechanism 34 is deformed, the tapered surfaces 37b, 37c of the second projection 37 and the inner wall surfaces 38a, 38b of the recess 38 may contact each other. Thus, in closing and opening the door, the tapered surfaces 37b, 37c of the second projection 37 of the second seal mechanism 34 and the inner wall surfaces 38a, 38b of the recess 38 may not contact each other, which increases the durability of the second seal mechanism 34.

Third Embodiment (Vehicle Door)

Next, a vehicle door seal 5 and a vehicle door 6 according to the third embodiment of the present invention will now be described. FIG. 8 is a schematic view showing a vehicle door seal 5 and a vehicle door 6, along with a part of a vehicle 105. The vehicle door 6 may be installed on the vehicle 105 such as a railway vehicle and may be a single sliding door structure including a single door leaf 40.

FIG. 8 is a schematic view as viewed from inside of the vehicle 105. In FIG. 8, the vehicle door 6 is represented with a two-dot chain line, and the level of the floor 105a of the vehicle 105 is represented with a broken line. The arrow A1 in FIG. 8 represents the direction in which the door leaf 40 moves to open. The arrow B1 in FIG. 8 represents the direction in which the door leaf 40 moves to close. The arrow C in FIG. 8 represents the vertical direction. The directions in which the door leaf 40 opens and closes are parallel to the front-rear direction of the vehicle 105. The front-rear direction of the vehicle 105 is parallel to the direction in which the vehicle 105 travels.

The vehicle door 6 shown in FIG. 8 may include a door leaf 40 and a vehicle door seal 5. The door leaf 40 may be installed on the doorway 106 of the vehicle 105. The door leaf 40 may constitute a single sliding door structure for opening and closing the doorway 106. In this embodiment, the door leaf 40 may be positioned on the inner side of the doorway 106 in the widthwise direction of the vehicle 105. The door leaf 40 is provided with a window 40a having a glass plate, etc. attached thereto.

(Door Driving Device and Door Hanger)

The door leaf 40 may be opened and closed by a door driving device 108. The door driving device 108 may include, for example, an electric motor, a driving pulley, a driven pulley, and a driving belt (all not shown).

The electric motor may drive the driving pulley. The driving pulley may be connected to the output shaft of the electric motor and may rotate along with the output shaft of the electric motor. The driving force of the driving pulley may be transmitted to the driven pulley via the driving belt, and the driven pulley may rotate in accordance with the rotation of the driving pulley. The driving belt may be a circular round belt and may be stretched around the driving pulley and the driven pulley. The driving belt stretched around the driving pulley and the driven pulley is arranged so as to extend substantially in parallel with the front-rear direction of the vehicle 105 between the driving pulley and the driven pulley.

The door leaf 40 may be connected to the door driving device 108 via a door hanger 109. The door hanger 109 may hang and support the door leaf 40. The door hanger 109 may be provided to connect the door driving device 108 and the door leaf 40. One end of the door hanger 109 may be connected to the driving belt of the door driving device 108 and the other end thereof may be connected to the door leaf 40.

With the above arrangement, the door driving device 108 can drive the door leaf 40 so as to open and close the doorway. That is, in operation of the door driving device 108, the electric motor may actuate to rotate the driving pulley, and the driving belt stretched around the driving pulley and the driven pulley may be turned. Accordingly, the door hanger 109 connected to the driving belt may be moved along the front-rear direction of the vehicle 105. Additionally, the door leaf 40 may be moved along with the door hanger 109. Thus, the door leaf 40 may be opened and closed. That is, in opening the doorway 106, the door leaf 40 may be driven in the direction of the arrow A1. That is, in closing the doorway 106, the door leaf 40 may be driven in the direction of the arrow B1.

The door driving device 108 may also include, for example, the same guide rail as in the first embodiment. The door hanger 109 or the door leaf 40 may be provided with rollers for rolling along the guide rail.

When the doorway 106 is closed, the ends of the door leaf 40 and the body of the vehicle 105 may be urged against each other such that they are tightly contacting via the vehicle door seal 5 (described later). Further, when the doorway 101 is closed, the door leaf 40 may be urged against the vehicle 105 at the edges of the doorway 106, if the above-mentioned guide rails and rollers are provided.

The vehicle 105 may be provided with a doorway seal 107 at the edges of the doorway 106. The doorway seal 107 may be a seal member made of rubber or a resin. The doorway seal 107 may be a seal member extending circularly along the edges of the doorway 106 arranged in a substantial rectangle. The doorway seal 107 may be attached inside the vehicle 105. The doorway seal 107 may have a flat end surface on the widthwise inner side of the vehicle 105. When the doorway 106 is closed, for example, the door leaf 40 and the first seal member 21 of the vehicle door seal 5 (described later) may be urged against the flat end surface of the doorway seal 107 on the widthwise inner side of the vehicle 105, if the above-mentioned guide rails and rollers are provided.

(Vehicle Door Seal)

The vehicle door seal 5 may seal between the ends of the door leaf 40 and the body of the vehicle 105 when the doorway 106 of the vehicle is closed. The vehicle door seal 5 may be installed on the end of the door leaf 40 and the body of the vehicle 105. The vehicle door seal 5 may include a first seal member 21 and a second seal member 22.

The first seal member 21 of the vehicle door seal 5 may be configured in the same manner as the first seal member 21 of the vehicle door seal 1 of the first embodiment. Also, the second seal member 22 of the vehicle door seal 5 may be configured in the same manner as the second seal member 22 of the vehicle door seal 1 of the first embodiment. However, the first seal member 21 and the second seal member 22 of the vehicle door seal 5 may be installed in a different manner than the first seal member 21 and the second seal member 22 of the vehicle door seal 1 of the first embodiment. The vehicle door seal 5 will be hereinafter described with respect to only the installation different from that of the first embodiment.

The vehicle door seal 5 may be installed on the end of the door leaf 40 and the body of the vehicle 105 in a single sliding door structure. The first seal member 21 of the vehicle door seal 5 may be installed on the first door leaf 40 of this embodiment at the door end thereof serving as the closing end. Further, the first seal member 21 may be installed on the door leaf 40 so as to extend vertically.

On the other hand, the second seal member 22 of the vehicle door seal 5 may be installed on the body of the vehicle 105 near the doorway 106. For example, the second seal member 22 may be installed on the body of the vehicle 105 near one end of the doorway 106 in the front-rear direction of the vehicle 105. The second seal member 22 may be installed on the body of the vehicle 105 so as to extend vertically. Further, the second seal member 22 may be installed on the body of the vehicle 105 such that the second seal member 22 can contact the first seal member 21 when the door leaf 40 closes the doorway 106.

(Effect of Vehicle Door Seal and Vehicle Door)

The above-mentioned vehicle door seal 5 and the vehicle door 6 may be provided with the first seal member 21 and the second seal member 22, which are the same as those in the first embodiment. Further, the first seal member 21 and the second seal member 22 may be provided with the first seal mechanism 23 and the second seal mechanism 24 as described for the first embodiment.

Accordingly, the vehicle door seal 5 and the vehicle door 6 may produce the same effect as in the first embodiment. With the vehicle door seal 5 and the vehicle door 6, it may be possible to suppress sudden increases and decreases of the atmospheric pressure in the vehicle even when the atmospheric pressure difference between outside and inside of the vehicle 105 is suddenly increased.

(Variation)

Although the embodiments of the present invention have been described above, the present invention is not restricted to the above-described embodiments, and various modifications are possible within the scope of the claims. For example, the following modifications are possible.

(1) In the above embodiments, the directions d1, d3 of the contact surfaces 30a, 30c may be along the direction in which the door leaves 11, 12 move (the front-rear direction of the vehicle), and the angles between the directions d2, d4, d5 of the contact surfaces 30b, 30d, 30e and the direction in which the door leaves 11, 12 move (the front-rear direction of the vehicle) may be 90° or 45°. However, the present invention is not limited to such embodiments; and any angles are possible as long as one of the two seal mechanisms does not affect the deformation of the other. For example, the angles between the directions d2, d4, d5 of the contact surfaces 30b, 30d, 30e and the direction in which the door leaves 11, 12 move (the front-rear direction of the vehicle) may be 80°, 60°, or 30°.

Further, it may also be possible that the directions d1, d3 of the contact surfaces 30a, 30c are not along the direction in which the door leaves 11, 12 move (the front-rear direction of the vehicle); and any angles are possible as long as the directions d1, d3 of the contact surfaces 30a, 30c and the directions d2, d4, d5 of the contact surfaces 30b, 30d, 30e intersect with each other.

(2) In the above embodiments, the first seal mechanism may be positioned on the widthwise outer side of the vehicle, whereas the second seal mechanism may be positioned on the widthwise inner side of the vehicle; but this is not essential. It may also be possible that the first seal mechanism be positioned on the widthwise inner side of the vehicle, whereas the second seal mechanism be positioned on the widthwise outer side of the vehicle.

(3) In the above embodiments, the door driving device includes an electric motor, a driving pulley, a driven pulley, a driving belt, and a guide rail; but such combination is not essential. For example, it may also be possible that the door driving device include an electric motor and a rack-and-pinion mechanism. Further, it may also be possible that the door driving device include an electric motor and a mechanism having a screw shaft and a nut member. Still further, it may also be possible that the door driving device include a pneumatic actuator or a hydraulic actuator.

(4) The sectional shapes of the first projection, the second projection, and the recess may be other than those in the above embodiments and can be modified variously within the scope of the claims. Additionally, in the above embodiments, the first projection and the second projection may have spaces defined therein; but it may also be possible that the first projection and the second projection do not have such spaces.

INDUSTRIAL APPLICABILITY

The present invention can be widely applied to vehicle door seals for tightly sealing between ends of a pair of door leaves or between an end of a single door leaf and a body of the vehicle when the doorway of the vehicle is closed, and to vehicle doors having such vehicle door seals.

LIST OF REFERENCE NUMBERS

1, 3, 5 vehicle door seals (door seals)
11, 12, 40 door leaves (door)
21, 31 first seal members
22, 32 second seal members
23, 33 first seal mechanisms
24, 34 second seal mechanisms
25 first projection (first seal portion)
26 first projection (second seal portion)
27 second projection (fourth seal portion, projection)

28 recess (third seal portion)
30a, 30c first contact surfaces
30b, 30d, 30e second contact surfaces
35 first projection (second seal portion)
36 flat portion (first seal portion)
37 second projection (third seal portion, projection)
38 recess (fourth seal portion)
100, 105 vehicles
101, 106 doorways

What is claimed is:

1. A door seal, comprising:
a first seal mechanism including a first seal portion provided on an end of a door and a second seal portion configured to contact the first seal portion when the door is closed; and
a second seal mechanism including a third seal portion provided on the end of the door and a fourth seal portion configured to contact the third seal portion when the door is closed, wherein the third seal portion and the first seal portion are arranged at different locations along a thickness direction of the door,
wherein the first seal mechanism includes a projection as one of the seal portions thereof and a projection as the other seal portion thereof,
wherein the second seal mechanism includes a projection as one of the seal portions thereof and a recess as the other seal portion thereof,
wherein the recess includes two side walls defined by two smooth continuously tapered surfaces and the projection of the second seal mechanism includes two side walls defined by two smooth continuously tapered surfaces,
wherein the two smooth continuously tapered surfaces of the recess of the second seal mechanism and the two smooth continuously tapered surfaces of the projection of the second seal mechanism define second contact surfaces,
wherein, when the door is closed, first contact surfaces of the first seal portion and the second seal portion extend in a direction that is different from a direction the second contact surfaces extend,
wherein the projection and recess of the second seal mechanism are constructed and shaped such that, when the door is closed, the projection of the second seal mechanism is fitted in the recess with a first contact area formed by an engagement of one of the two smooth continuously tapered surfaces of the side walls of the recess and one of the two smooth continuously tapered surfaces of the side walls of the projection of the second seal mechanism and with a second contact area formed by an engagement of the other of the two smooth continuously tapered surfaces of the side walls of the recess and the other of the two smooth continuously tapered surfaces of the side walls of the projection of the second seal mechanism,
wherein the projection of the second seal mechanism includes a non-contact surface that extends from one of the two smooth continuously tapered surfaces of the projection of the second seal mechanism to the other of the two smooth continuously tapered surfaces of the projection of the second seal mechanism, wherein an entirety of the non-contact surface of the projection of the second seal mechanism is spaced apart from the recess when the door is closed, and
wherein a length, in a moving direction in which the door moves, of the projection of the second seal mechanism is greater than a length, in the moving direction in which the door moves, of one of the projections of the first seal mechanism.

2. The door seal of claim 1, wherein the second contact surfaces generally extend in the moving direction in which the door moves, and wherein the first contact surfaces extend in the thickness direction of the door.

3. The door seal of claim 1, wherein the second seal mechanism is closer to an inner side of the door than the first seal mechanism.

4. The door seal of claim 1, wherein one of the projections of the first seal mechanism projects in the moving direction in which the door moves from a first flat base surface that is parallel to the thickness direction of the door, and the other of the projections of the first seal mechanism projects in the moving direction in which the door moves from a second flat base surface that is parallel to the thickness direction of the door, and
wherein the recess of the second seal mechanism is recessed in the moving direction in which the door moves from the first flat base surface, and the projection of the second seal mechanism projects in the moving direction in which the door moves from the second flat base surface.

5. The door seal of claim 4, wherein the first flat base surface and the second flat base surface are apart from each other when the door is closed.

6. The door seal of claim 1, wherein the projection and the recess of the second seal mechanism are in contact with each other only through both the first contact area and the second contact area when the door is closed.

7. The door seal of claim 1, wherein one of the projections of the first seal mechanism is provided, at a peak portion thereof projecting toward the other of the projections of the first seal mechanism, with a ridge further projecting toward the other of the projections of the first seal mechanism.

8. The door seal of claim 1, wherein the two side walls of the projection of the second seal mechanism are spaced apart from each other along the thickness direction of the door.

9. The door seal of claim 1, wherein, when the door is closed, the non-contact surface of the projection of the second seal mechanism faces a bottom portion of the recess with a gap being maintained between the non-contact surface of the projection of the second seal mechanism and the bottom portion of the recess.

10. A door installed on a vehicle, comprising:
a door seal comprising:
a first seal mechanism including a first seal portion provided on an end of the door and a second seal portion configured to contact the first seal portion when the door is closed; and
a second seal mechanism including a third seal portion provided on the end of the door and a fourth seal portion configured to contact the third seal portion when the door is closed, wherein the third seal portion and the first seal portion are arranged at different locations along a thickness direction of the door,
wherein the first seal mechanism includes a projection as one of the seal portions thereof and a projection as the other seal portion thereof,
wherein the second seal mechanism includes a projection as one of the seal portions thereof and a recess as the other seal portion thereof,
wherein the recess includes two side walls defined by two smooth continuously tapered surfaces and the projection of the second seal mechanism includes two side walls defined by two smooth continuously tapered surfaces, wherein the two smooth continuously tapered surfaces of the recess of the second seal mechanism and the two smooth continuously tapered surfaces of the projection of the second seal mechanism define second contact surfaces, wherein, when the door is closed, first contact surfaces of the first seal portion and the second seal portion extend in a direction that is different from a direction the second contact surfaces extend, wherein the projection and recess of the second seal mechanism are constructed and shaped such that, when the door is closed, the projection of the second seal mechanism is fitted in the recess with a first contact area formed by an engagement of one of the two smooth continuously tapered surfaces of the side walls of the recess and one of the two smooth continuously tapered surfaces of the side walls of the projection of the second seal mechanism and with a second contact area formed by an engagement of the other of the two smooth continuously tapered surfaces of the side walls of the recess and the other of the two smooth continuously tapered surfaces of the side walls of the projection of the second seal mechanism, wherein the projection of the second seal mechanism includes a non-contact surface that extends from one of the two smooth continuously tapered surfaces of the projection of the second seal mechanism to the other of the two smooth continuously tapered surfaces of the projection of the second seal mechanism, wherein an entirety of the non-contact surface of the projection of the second seal mechanism is spaced apart from the recess when the door is closed, wherein a length, in a moving direction in which the door moves, of the projection of the second seal mechanism is greater than a length, in the moving direction in which the door moves, of one of the projections of the first seal mechanism, and wherein the first seal portion and the third seal portion of the door seal are provided at the end of the door, and the second seal portion and the fourth seal portion of the door seal are provided opposite to, and facing, the end of the door.

* * * * *